(12) United States Patent
Lorin et al.

(10) Patent No.: US 12,093,098 B2
(45) Date of Patent: Sep. 17, 2024

(54) USB POWER DELIVERY INTERFACE

(71) Applicant: STMicroelectronics (Grenoble 2) SAS, Grenoble (FR)

(72) Inventors: Christophe Lorin, Montbonnot (FR); Nathalie Ballot, Sassenage (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 284 days.

(21) Appl. No.: 17/647,125

(22) Filed: Jan. 5, 2022

(65) Prior Publication Data

US 2022/0244770 A1 Aug. 4, 2022

(30) Foreign Application Priority Data

Jan. 29, 2021 (FR) ........................................ 2100894

(51) Int. Cl.
*G06F 1/26* (2006.01)
*G06F 13/40* (2006.01)

(52) U.S. Cl.
CPC .......... *G06F 1/266* (2013.01); *G06F 13/4068* (2013.01); *G06F 2213/0042* (2013.01)

(58) Field of Classification Search
CPC ................. G06F 1/266; G06F 13/4068; G06F 2213/0042
USPC ........................................................ 323/277
See application file for complete search history.

(56) References Cited

U.S. PATENT DOCUMENTS

| | | | |
|---|---|---|---|
| 10,431,976 B2 | 10/2019 | Uan-Zo-li et al. | |
| 2018/0331547 A1* | 11/2018 | Trochut | G01D 21/00 |
| 2018/0341309 A1* | 11/2018 | Sporck | G06F 13/4295 |

FOREIGN PATENT DOCUMENTS

| | | | | |
|---|---|---|---|---|
| EP | 0056809 B1 * | 6/1985 | | H03F 3/04 |
| WO | 2019013125 A1 | 1/2019 | | |

OTHER PUBLICATIONS

"Universal Serial Bus Power Delivery Specification Revision 3.0", Version 1.1, http://www.usb.org/, Jan. 12, 2017, 31 pages.

* cited by examiner

*Primary Examiner* — Yemane Mehari
(74) *Attorney, Agent, or Firm* — Slater Matsil, LLP

(57) ABSTRACT

The present disclosure relates to an USB PD-type interface including a first node receiving a first potential, a second node delivering a second potential, and a third node at a reference potential; a resistor connected between a fourth node coupled to the first node, and a fifth node; a MOS transistor connected between the fifth node and the second node; a bipolar transistor having a collector connected to a gate of the MOS transistor and an emitter connected to the fourth node or to the fifth node; and a circuit configured to deliver a control potential to a base of the bipolar transistor determined from a current in the first resistor.

21 Claims, 5 Drawing Sheets

USB POWER DELIVERY INTERFACE

CROSS-REFERENCE TO RELATED APPLICATIONS

This application claims the benefit of French Application No. 2100894, filed on Jan. 29, 2021, which application is hereby incorporated herein by reference.

TECHNICAL FIELD

The present disclosure generally concerns USB ("Universal Serial Bus") C-type interface circuits, or USB-C interfaces, adapted to the implementation of the "Power Delivery" technology, also called USB PD-type interfaces, or, more simply, USB PD interfaces.

BACKGROUND

The USB PD technology is a technology which is used on USB-C-type cables and connectors. Such a technology enables, among other things, managing the powering of electronic devices.

During the electric power supply of a device, called sink, by another device, called source, by implementing the USB PD technology, a USB-C-type connector of the source is coupled to a USB-C-type connector of the sink, possibly via a cable adapted to the USB PD technology.

On the sink side, the USB-C-type connector is electrically coupled to applications or circuits of the sink via a USB PD interface. The interface for example implements the protocols defined by the USB PD technology, such as for example the negotiation of a supply power that the source will deliver to the sink in order to power it.

Known USB PD interfaces of devices having the role of a sink on implementation of the USB PD technology suffer from various limitations.

SUMMARY

There is a need to overcome all or part of the limitations of known USB PD interfaces, for example of the known USB PD interfaces of devices adapted to having the role of a sink on implementation of the USB PD technology.

An embodiment overcomes all or part of the limitations of known USB PD interfaces, for example, of known USB PD interfaces of devices adapted to having the role of a sink on implementation of the USB PD technology.

One embodiment provides USB PD-type interface comprising, a first node configured to receive a first power supply potential, a second node configured to deliver a second power supply potential, and a third node configured to be at a reference potential; a first resistor connected between a fourth node coupled to the first node, and a fifth node; a first MOS transistor connected between the fifth node and the second node; a second bipolar transistor having a collector connected to a gate of the first transistor and an emitter connected to the fourth node or to the fifth node; and a first circuit configured to deliver a control potential to a base of the second transistor determined from a current in the first resistor.

According to an embodiment, the first circuit is configured to determine the control potential to limit the current in the first resistor with respect to a current threshold.

According to an embodiment, the first circuit is configured to increase the base-emitter voltage of the second transistor when the current in the first resistor increases above the current threshold.

According to an embodiment, the first transistor is a PMOS transistor, and the second transistor is a PNP transistor.

According to an embodiment, the emitter of the second transistor is connected to the fourth node and the first circuit comprises a direct connection between the base of the second transistor and the fifth node.

According to an embodiment, the first circuit comprises an NPN transistor having an emitter coupled, for example, connected to the third node and a collector connected to the fourth node or to the fifth node by a voltage dividing bridge comprising an intermediate node configured to supply the control potential, and a circuit configured to supply a potential to the base of the NPN transistor determined from a voltage across the first resistor, a gain between the voltage across the first resistor and the control potential being preferably variable and determined by the first power supply potential.

According to an embodiment, the first circuit comprises an operational amplifier having a first input coupled to the fourth node, a second input coupled to the fifth node, and an output coupled to the base of the second transistor, and a diode and a resistor in series between the fourth node or the fifth node and the third node, a node of connection of the diode and of the resistor being configured to deliver a floating ground to the operational amplifier, a gain of the operational amplifier being preferably variable and determined by the first power supply potential.

According to an embodiment, the interface further comprises a second circuit configured to deliver a binary signal in a first binary state when the second power supply potential is greater than the first power supply potential possibly increased by a margin; and a switch configured to couple the second node to the third node when the binary signal is in its first state.

According to an embodiment, the second circuit comprises a PNP transistor having a base coupled to the fourth node, a collector coupled to the third node by a resistor, and an emitter coupled, for example connected, to the second node, the binary signal being delivered by the collector of the PNP transistor; or a comparator comprising an operational amplifier having a first input coupled to the fourth node or to the first node, a second input coupled to the second node, and an output delivering the binary signal.

According to an embodiment, the interface further comprises a circuit for controlling the first transistor comprising a transistor and a voltage dividing bridge having an intermediate node connected to the gate of the first transistor, the transistor of the circuit for controlling the first transistor having a conduction terminal coupled to the third node and another conduction terminal coupled to the fourth node or to the fifth node by the voltage dividing bridge, preferably the transistor of the circuit for controlling the first transistor being an NPN transistor and the interface further comprising another voltage dividing bridge coupling the fourth node or the fifth node to the third node and having an intermediate node connected to the base of the NPN transistor of the circuit for controlling the first transistor.

According to an embodiment, the circuit for controlling the first transistor further comprises a switch configured to couple the control terminal of the transistor of the circuit for controlling the first transistor to the third node when the binary signal is in the first state.

According to an embodiment, the interface further comprises a third PMOS transistor coupling the fourth node to the first node.

According to an embodiment, the interface further comprises a circuit for controlling the third transistor comprising a transistor and a voltage dividing bridge having an intermediate node connected to the gate of the third transistor, the transistor of the circuit for controlling the third transistor having a conduction terminal coupled to the third node and another conduction terminal coupled to the fourth node or to the fifth node by the voltage dividing bridge, preferably the transistor of the circuit for controlling the third transistor being an NPN transistor and the interface further comprising another voltage dividing bridge coupling the fourth node or the fifth node to the third node and having an intermediate node connected to the base of the NPN transistor of the circuit for controlling the third transistor.

According to an embodiment, the circuit for controlling the third transistor further comprises a switch configured to couple the control terminal of the transistor of the control circuit to the third node when the binary signal is in the first state.

According to an embodiment, the interface further comprises a fourth NPN transistor having an emitter connected to the fourth node or to the fifth node, and a collector connected to a gate of the first transistor; a resistor; and a capacitive element series-connected with the resistor between a base of the fourth transistor and the third node.

According to an embodiment, the interface further comprises a device for discharging the capacitive element configured to discharge the capacitive element when the second power supply potential is greater than the first power supply potential possibly increased by a margin.

According to an embodiment, the discharge device comprises a diode having its anode coupled to the base of the fourth transistor and having its cathode coupled to the emitter of the fourth transistor; or a switch connected in parallel with the capacitor.

According to an embodiment, the interface further comprises a resistor and a Zener diode series-connected between the base of the fourth transistor and the conduction terminal of the transistor of the circuit for controlling the first transistor.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the USB PD technology has not been detailed, the described embodiments and variants being compatible with the USB PD technology, for example described in the successive versions of document "USB Power Delivery Specification," for example available on the website "https://www.usb.org."

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

In the following description, unless specified otherwise, all potentials are referenced to a same reference potential, typically ground GND.

In the following description, unless specified otherwise, a MOS transistor designates a transistor of "Metal Oxide Semiconductor" type, and a PMOS, respectively NMOS, transistor designates a P-channel, respectively N-channel, MOS transistor. Similarly, an NPN, respectively PNP, transistor designates an NPN-type, respectively PNP-type, bipolar transistor.

Figure 1:
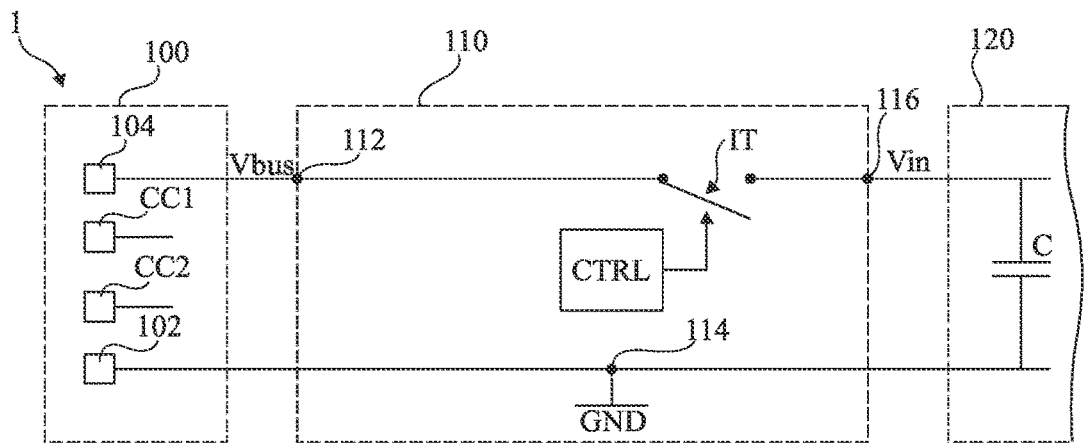
FIG. 1 schematically and partially shows an example of a device adapted to having the role of a sink in an implementation of the USB PD technology.

FIG. 1 schematically and partially shows an example of a device 1 capable of having the role of a sink in an implementation of the USB PD technology.

Device 1 comprises a connector 100, delimited by dotted lines, on the left-hand side, in FIG. 1.

Connector 100 is adapted to the USB PD technology. Connector 100 is configured to be coupled to a complementary connector adapted to the USB PD technology. In other words, connector 100 is configured to be electrically coupled to a device, for example, a laptop computer or a charger, adapted to having the role of a sink during an implementation of the USB PD technology to power device 1.

Connector 100 comprises a first terminal 102 configured to be coupled to a first corresponding terminal of the complementary connector. Terminal 102 is configured to receive a reference potential, typically ground GND, when connector 100 is coupled, via the complementary connector, to the device having the role of a source.

Connector 100 further comprises a second terminal 104 configured to be coupled to a second corresponding terminal of the complementary connector. Terminal 104 is configured to receive a power supply potential Vbus when connector 100 is coupled, via the complementary connector, to the device having the role of a source.

Connector 100 further comprises communication terminals configured to be coupled to corresponding communication terminals of the complementary connector. In this example, the connector comprises two communication terminals CC1 and CC2. Communication terminals CC1 and CC2 are configured to allow the data exchange with the device coupled to device 1 via connector 100, by implementing the communication protocols of the USB-C technology.

Device 1 further comprises a USB PD interface no, delimited by dotted lines, in the middle, in FIG. 1. Interface no is arranged between connector 100 and a circuit or an application 120 to be powered of device 1. Circuit 120 is delimited by dotted lines, on the right-hand side, in FIG. 1.

Interface 110 comprises a node 112 configured to receive potential Vbus. Node 112 is arranged on the side of connector 100. Node 112 is coupled, preferably connected, to the terminal 104 of connector 100.

Interface 110 comprises a node 114 configured to be set to reference potential GND. Node 114 is coupled, preferably connected, to the terminal 102 of connector 100.

Interface 110 comprises a node 116 and a switch IT coupling node 112 to node 116. The path coupling node 112 to node 116 and comprising switch IT is currently called power path. Node 116 is configured to deliver a power supply potential Vin. For example, node 116 is configured to deliver potential Vin at a non-zero value when switch IT is conductive or, in other words, when the power path is active. Node 116 is arranged on the side of application 120.

Nodes 114 and 116 are connected to application 120, so that the application can be powered by potential Vin when switch IT is on.

Interface 110 comprises a circuit CTRL for controlling switch IT. Circuit CTRL is for example configured to turn off switch IT when connector 100 is not coupled to a source of USB PD type or when potential Vbus reaches values greater than a high OVLO ("OverVoltage Lock Out") threshold or values smaller than a low UVLO ("UnderVoltage Lock Out") threshold. The UVLO and OVLO thresholds are defined by the USB PD technology and are at least partly determined by a supply power negotiated according to a protocol defined by the USB PD technology, between device 1 and the device which powers it. The UVLO and OVLO thresholds have different values according to the negotiated voltage, that is to say the target value of the potential Vbus which corresponds to the negotiated power.

Thus, switch IT enables to protect application 120 against unwanted values of potential Vbus.

Device 1 also comprises a capacitive element C connected between nodes 116 and 114. In the example of FIG. 1, capacitive element C belongs to application 120, although it may also be represented as belonging to interface no.

Figure 2:
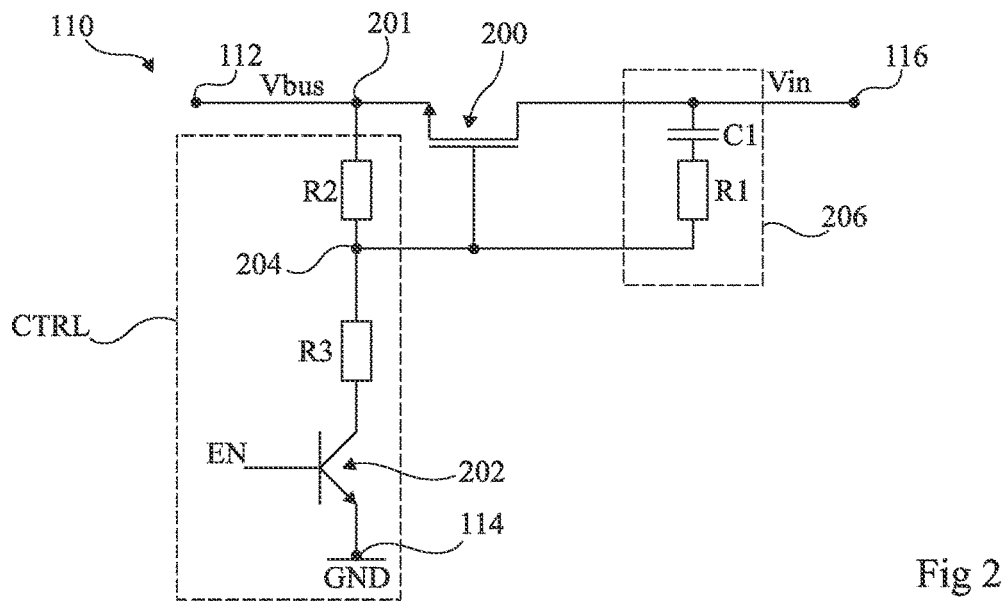
FIG. 2 shows in more detailed fashion an example of a portion of a USB PD interface of the device of FIG. 1.

FIG. 2 shows in more detailed fashion an example of a portion of interface 110. More particularly, FIG. 2 shows an example of implementation of switch IT and of its control circuit CTRL.

In this example, switch IT (FIG. 1) is implemented by means of a single PMOS transistor 200. The source of transistor 200 is coupled, for example, connected in the example of FIG. 2, to a node 201, node 201 being coupled, in this example connected, to the node 112 of interface no.

The drain of transistor 200 is coupled, for example, connected, to the node 116 of interface no.

In this example, circuit CTRL, a portion only of which is shown and is delimited in dotted lines in FIG. 2, comprises an NPN transistor 202 and a voltage dividing bridge series-connected between node 114 and node 201. The emitter of transistor 202 is coupled, for example, connected, to node 114, the collector of transistor 202 being coupled to node 201 by the voltage dividing bridge. In this example, the voltage dividing bridge comprises two resistors R2 and R3, resistor R2 having a terminal connected to node 201. An intermediate node 204 of the dividing bridge, in this example the node 204 of connection of resistor R2 to resistor R3, is connected to the gate of transistor 200. The base of transistor 202 is configured to receive a binary signal EN. Binary signal EN is for example delivered by a portion, not shown, of circuit CTRL. When signal EN is in a first binary state, for example, corresponding to a high potential, transistor 202 draws a current from node 201 to node 114, whereby the voltage between the source and the gate of transistor 200, that is, the voltage across resistor R2 in this example, is sufficient to keep transistor 200 on. When signal EN is in a second binary state, for example, corresponding to a low potential, for example, ground potential GND, transistor 202 is clamped, whereby the voltage between the source and the gate of transistor 200 is zero, transistor 200 then being clamped.

When a device having the role of a source implementing the USB PD technology is connected to connector 100 (FIG. 1), as long as this source does not deliver a potential Vbus equal to a default value, typically 5 V, switch 200 is kept off. When potential Vbus settles at this default value, switch 200 turns on, and capacitive element C (FIG. 1) charges.

A charge of capacitive element C also occurs when a renegotiation of the supply power to be delivered by the source to device 1 (FIG. 1) results in that potential Vbus increases from a first set point value to a second set point value.

To limit the current drawn by capacitive element C during its charge, interface no comprises a circuit 206 configured to limit this inrush current below a threshold defined by the USB PD technology. Circuit 206 comprises a capacitive element C1 and a resistor R1, series-connected between node 116 and the gate of transistor 200.

In this example, the values of resistor R1 and of capacitive element C1 are determined according to the current threshold and to the maximum value of capacitive element C defined by the USB PD technology, the maximum value of capacitive element C then being, for example, in the order of some hundred nanoFarads.

Figure 3:
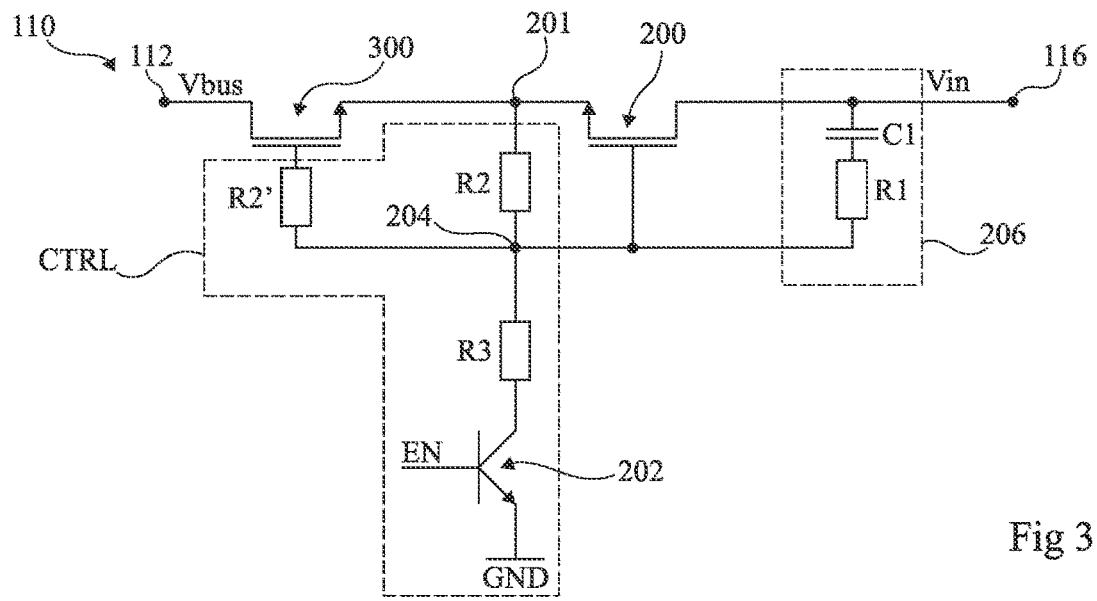
FIG. 3 shows in more detailed fashion another example of a portion of a USB PD interface of the device of FIG. 1.

FIG. 3 shows in more detailed fashion another example of a portion of the interface 110 of FIG. 1. More particularly, FIG. 3 shows another example of implementation of switch IT and of its control circuit CTRL. The portion of interface no illustrated in FIG. 2 and that illustrated in FIG. 3 comprise many elements in common, and only the differences between these interfaces no are here highlighted.

As compared with the interface 110 of FIG. 2, the switch IT (FIG. 1) of the interface 110 of FIG. 3 is implemented not only with transistor 200, but further with a PMOS transistor 300.

The source of transistor 300 is coupled, for example, connected, in the example of FIG. 3, to node 201. The drain of transistor 300 is coupled, for example, connected, to the node 112 of interface 110.

In this example, the node 204 of control circuit CTRL is coupled to the gate of transistor 300, for example, via a resistor R2'.

Transistor 300 implements a protection against inverse voltages. In other words, the transistor 300 allows to prevent the passage of a positive current from the terminal 116 to the terminal 112 when the transistor 300 is off, for example when its gate-source voltage is null, or when the potential Vbus is negative.

The examples of interfaces 110 described in relation with FIG. 2 and FIG. 3 effectively enable to limit the inrush current resulting from the charge of capacitive element C below a threshold defined by the USB PD technology, when the value of this capacitive element C is smaller than or equal to the maximum value defined by the USB PD technology.

An application 120, for example, an audio application, which consumes a power P1 but which occasionally requires a supply power P2 greater than power P1, in the usual case where capacitive element C has a value smaller than or equal to the maximum value defined by the USB PD technology, is considered as an example.

For application 120 to be correctly powered by a USB PD power source coupled to connector 100 (FIG. 1), either the negotiated power should be greater than power P2, or the negotiated power should be greater than P1 when the application consumes power P1 and be renegotiated to be greater than power P2 each time the application consumes power P2. However, having a negotiated power greater than power P2 all along the operation of application 120 limits the power that the power source could deliver to power, simultaneously to device 1 (FIG. 1), one or a plurality of other devices adapted to the USB PD technology. Further, renegotiating a supply power greater than power P2 each time application 120 occasionally consumes power P2 is not desirable, and, more generally, is not possible when the time required for renegotiating the supply power is greater than the time during which the application 120 required the power P2 to be correctly powered.

The inventors thus provide increasing the value of capacitive element C above the maximum value defined by the USB PD technology, so that application 120 can be correctly powered when the negotiated power is between powers P1 and P2. More exactly, the inventors provide increasing the value of capacitive element C so that, when application 120 occasionally consumes power P2, the difference between power P1 and power P2 is delivered by capacitive element C, which enables to keep a negotiated power smaller than P2.

As an example, an application 120 having a power P1 smaller than or equal to 30 W and which occasionally consumes a power P2 equal to 100 W for 5 ms. It is further considered that the negotiated power is equal to 30 W and corresponds to a 15-V set point value for potential Vbus. Capacitive element C should enable to deliver an additional 70 W under a potential Vbus equal to 15 V, that is, an additional 40.6-A current. To ensure that potential Vbus does not fall below the UVLO threshold, in this example equal to 0.95 time the set point value of potential Vbus, that is to 0.95*15 V, potential Vbus should not decrease by more than 750 mV. As a result, capacitive element C should have a value at least equal to 4.6*0.005/0.75=3,000 µF, which is much greater than the maximum value of capacitive element C defined by the USB PD technology.

However, when the value of capacitive element C is greater than the maximum value defined by the USB PD technology, and when the values of the components R1 and C1 of circuit 206 have been determined based on this maximum value of capacitive element C, circuit 206 no longer enables, during the charge of capacitive element C, to keep the inrush current below the current threshold defined by the USB PD technology.

It could have been devised to modify the values of the components R1 and C1 of circuit 206 according to the value of capacitive element C. This would however result in different interfaces 110 according to the value of capacitive element C, that is, in interfaces 110 which would be different according to the application 120 connected to each of these interfaces 110. This would complexify the development and the manufacturing of these interfaces 110, which is not desirable.

Figure 4:
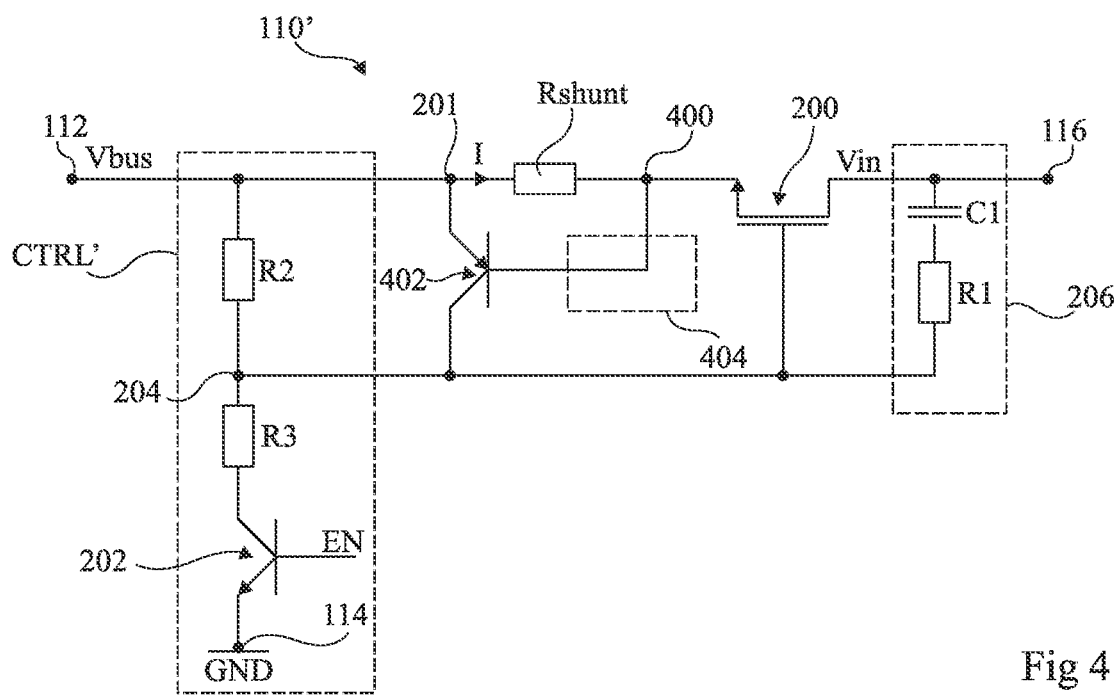
FIG. 4 schematically shows an implementation mode of the USB PD interface of the device of FIG. 1.

FIG. 4 schematically shows an embodiment of an interface 110' replacing the interface 110 of the device 1 of FIG. 1.

Interface 110' comprises, like interface 110 (FIG. 1, FIG. 2, and FIG. 3), nodes 112, 114, 116, and 201, transistor 200 and circuit 206.

Interface 110' further comprises a resistor Rshunt connected between node 201 and a node 400 connected to the source of transistor 200. In the embodiment illustrated in FIG. 4, node 201 is connected to node 112. In an alternative embodiment, node 201 is coupled to node 112 by transistor 300 (FIG. 3), node 201 then being connected to the source of transistor 300.

Interface 110' further comprises a circuit CTRL' for controlling transistor 200, a portion only of which is shown and is delimited by dotted lines in FIG. 4. This portion of circuit CTRL' is for example identical to the portion of circuit CTRL described in relation with FIG. 2. In the example of FIG. 4, the dividing bridge R2, R3 of circuit CTRL' is connected to node 201, although it may be connected to node 400 in other examples. However, preferably, the dividing bridge R2, R3 is connected to the node 201 which allows the current in the resistor Rshunt, which is used to control the gate-source voltage of the transistor 200, to be being the current which is provided to the application 120 (FIG. 1).

Interface 110' further comprises a PNP transistor 402. The collector of transistor 402 is connected to the gate of transistor 200, that is, to node 204 in this example. In this embodiment, the emitter of transistor 402 is connected to node 201.

Interface 110' comprises a circuit 404 delimited by dotted lines in FIG. 4. Circuit 404 is configured to deliver a control potential to the base of transistor 402. This control potential is determined from a current I in resistor Rshunt. More exactly, circuit 404 is configured to determine the base potential of transistor 202 from current I, so that current I is limited with respect to a current threshold Ilim, that is, so that current I remains smaller than this threshold Ilim. Current threshold Ilim is determined by the USB PD technology which defines the maximum value Imax of current I that interface 110' is authorized to draw from node 112. For example, threshold Ilim is smaller than or equal to value Imax.

In the embodiment of FIG. 4, circuit 404 corresponds to or comprises a direct connection between node 400 and the base of transistor 402. Threshold Ilim is for example substantially equal to Vbelim times the value of resistor Rshunt, Vbelim being the turn-on voltage of the base-emitter diode of transistor 402.

In this embodiment, when transistor 200 is conductive and potential Vin is smaller than potential Vbus, capacitive element C (FIG. 1) draws a current I in order to charge, the difference between potentials Vin and Vbus then corresponding to the sum of the voltage across resistor Rshunt and of the source-drain voltage of transistor 200. As soon as current I becomes equal to Ilim, the base-emitter voltage of transistor 402 is equal to Vbelim and transistor 402 is on. If current I tends to increase above threshold Ilim, this tends to decrease the base voltage of transistor 402, and thus to decrease the emitter-collector voltage of transistor 402. This decrease of the emitter-collector voltage of transistor 402 corresponds to a decrease in the gate-source voltage of transistor 200, which becomes more resistive, which causes a decrease of current I down to value Ilim. However, as long as current I is smaller than current Ilim, transistor 402 is clamped and transistor 200 is on (saturated).

Figure 5:
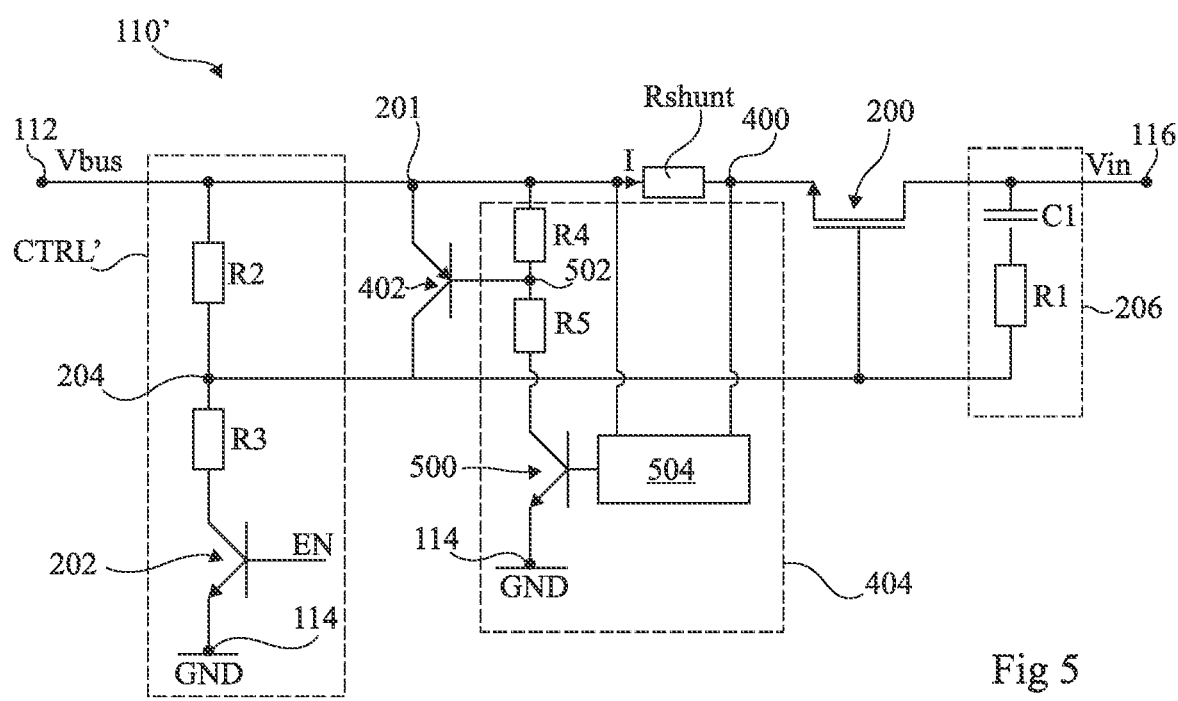
FIG. 5 schematically shows another embodiment of the USB PD interface of the device of FIG. 1.

FIG. 5 schematically shows another embodiment of interface 110'. The interface 110' described in relation with FIG. 5 comprises many elements in common with the interface 110' described in relation with FIG. 4, and only the differences between these two interfaces 110' are here highlighted.

The interface 110' of FIG. 5 differs from that of FIG. 4 by its circuit 404.

In this embodiment, circuit 404 comprises no direct connection between the base of transistor 402 and node 400. In this embodiment, circuit 404 comprises an NPN transistor 500. The emitter of transistor 500 is coupled, for example, connected, to node 114. The collector of transistor 500 is coupled to node 201 by a voltage dividing bridge. The voltage dividing bridge comprises an intermediate node 502 configured to deliver the control potential to the base of transistor 402. In this example, the dividing bridge comprises two resistors R4 and R5, resistor R4 being connected to node 201, resistor R5 being connected to transistor 500, and node 502 corresponding to the node of connection of resistor R4 to resistor R5. In this embodiment, circuit 404 comprises a circuit 504. Circuit 504 is configured to deliver a potential to the base of transistor 500, this potential being determined from the voltage across resistor Rshunt. Circuit 504 is thus configured to receive the voltage across resistor Rshunt, circuit 504 comprising an input terminal connected to a terminal of resistor Rshunt and another input terminal connected to another terminal of resistor Rshunt. Circuit 504 delivers the base potential of transistor 500 so that this potential increases when the voltage across Rshunt increases, whereby the control potential on node 502 decreases when the voltage across Rshunt increases. Thus, as in FIG. 4, when the current I in resistor Rshunt increases above threshold Ilim and causes an increase of the voltage across Rshunt, this controls a corresponding decrease of the potential on the base of transistor 402, and thus a corresponding decrease of the gate-source voltage of transistor 200, which allows a corresponding increase of the drain-source voltage of transistor 200 and thus a corresponding decrease of current I. The current I in resistor Rshunt is thus controlled to be limited with respect to threshold Ilim or, in other words, to keep current I smaller than or equal to threshold Ilim.

As compared with FIG. 3 where threshold Ilim is determined by the value of resistor Rshunt and of the turn-on voltage Vbelim of the emitter-base diode of transistor 402, in this embodiment, threshold Ilim is at least partly determined by the gain of circuit 504, between the voltage that it receives and the potential that it delivers.

Thus, as compared with the embodiment of FIG. 4, the value of resistor Rshunt may be decreased, which enables to decrease the power dissipated by resistor Rshunt.

According to an embodiment, the gain of circuit 504 is variable and is determined by the value of the negotiated power, that is, for example, by the value of the potential Vbus received by interface 110'. The provision of a variable gain enables to adapt the value of threshold Ilim according to the value of the negotiated power. As an example, although this is not shown in FIG. 5, circuit 404 comprises a voltage dividing bridge between the base of transistor 500 and the output of circuit 504 which is coupled to the base of transistor 500, and at least one of the resistors of this dividing bridge has a value controlled by the value of Vbus. For example, this controlled-value resistor is implemented by a parallel association of a resistor and of a MOS transistor controlled by a potential determined by potential Vbus.

In an alternative embodiment, not illustrated, the dividing bridge R4, R5 of circuit 404 couples the collector of transistor 500 to node 400 rather than to node 201.

In another embodiment, not illustrated, circuit 404 is implemented by means of an operational amplifier. The amplifier is provided with a negative feedback loop, that is, a feedback between its output and its inverting input. The amplifier is configured to deliver a control potential to the base of transistor 402 which decreases when current I increases with respect to threshold Ilim, that is, when the voltage across the resistor increases above a voltage threshold equal to Ilim times the value of resistor Rshunt. The amplifier has a first input, for example, inverting, coupled to node 201 and a second input, for example, non-inverting, coupled to node 400. The output of the amplifier is coupled to the base of transistor 402. The amplifier is powered by potential Vbus, referenced to a floating ground delivered to the operational amplifier. As an example, a Zener diode and a resistor are series-connected between nodes 201 and 114, a node of connection of the diode to the resistor being configured to deliver the floating ground to the operational amplifier.

According to a variant of this embodiment, the gain of the operational amplifier is variable and is determined by the negotiated power, for example, by the value of potential Vbus. As an example, a resistor of the feedback loop or a resistor coupling an input of the amplifier to a corresponding terminal of resistor Rshunt has a controllable value. This controllable-value resistor is for example implemented similarly to what has been described for the case where the gain of circuit 504 is variable and is determined by the negotiated power.

Figure 6:
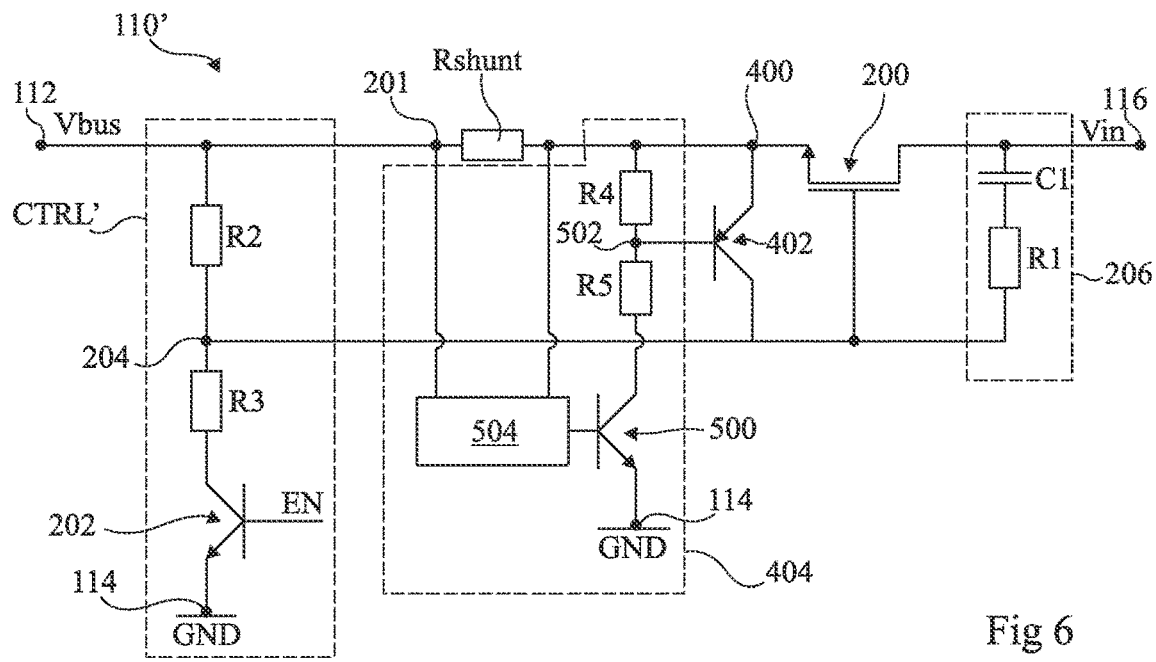
FIG. 6 schematically shows an alternative embodiment of the interface of FIG. 5.

FIG. 6 schematically shows an alternative embodiment of the interface of FIG. 5. Only the differences between the interface 110' of FIG. 6 and that of FIG. 5 are here highlighted.

In this variant, the emitter of transistor 402 is connected to node 400 rather than to node 201. The case where circuit 404 is similar to that of FIG. 5 and where the collector of transistor 500 is coupled to node 400 by the dividing bridge R4, R5 of circuit 404 has been shown as an example. In another example, not illustrated, the dividing bridge R4, R5 of circuit 404 couples the collector of transistor 500 to node 201 rather than to node 400. In still another example, not illustrated, circuit 404 is implemented with an operational amplifier, similarly to what has been described in relation with FIG. 5.

Examples of embodiments and of variants where the switch IT of device 1 (FIG. 1) is implemented with transistor 200 only have been described hereabove. Of course, these examples of embodiments and of variants may be easily adapted by those skilled in the art in the case where the switch IT of device 1 (FIG. 1) is implemented with transistor 200 and transistor 300, transistor 300 then coupling node 201 to node 112 as described in relation with FIG. 3. It will then be within the abilities of those skilled in the art to provide a circuit for controlling transistor 300, for example by coupling the node 204 of circuit CTRL' to the base of transistor 300, directly or via a resistor or, for example, by providing a control circuit specific to transistor 300. This specific control circuit is for example similar to circuit CTRL' and then comprises an NPN transistor having its emitter coupled, preferably connected, to node 114, and its collector coupled to node 201 or to node 400 by a voltage dividing bridge having an intermediate node connected to the gate of transistor 300, the base of the NPN transistor receiving a binary control signal.

In the examples of embodiments and variants described hereabove in relation with FIG. 4, FIG. 5, and FIG. 6, transistor 402 and its control circuit 404 enable to limit the current I in resistor Rshunt when capacitive element C (FIG. 1) charges, for example, after the turning on of transistor 200 when potential Vbus reaches its default value, or after a modification towards higher values of potential Vbus resulting from a renegotiation of the power to be supplied by the source to interface 110'.

However, on decrease of potential Vbus, for example, after a disconnection of device 1 (FIG. 1) and of the device delivering potential Vbus thereto, or after a renegotiation of the power to be supplied to the interface resulting in a modification of the target value of the potential Vbus, potential Vin becomes greater than potential Vbus, which is not desirable.

Thus, according to an alternative embodiment, interface 110' further comprises a device for discharging capacitive element C (FIG. 1) when potential Vin is greater than potential Vbus, possibly increased by a margin.

Figure 7:
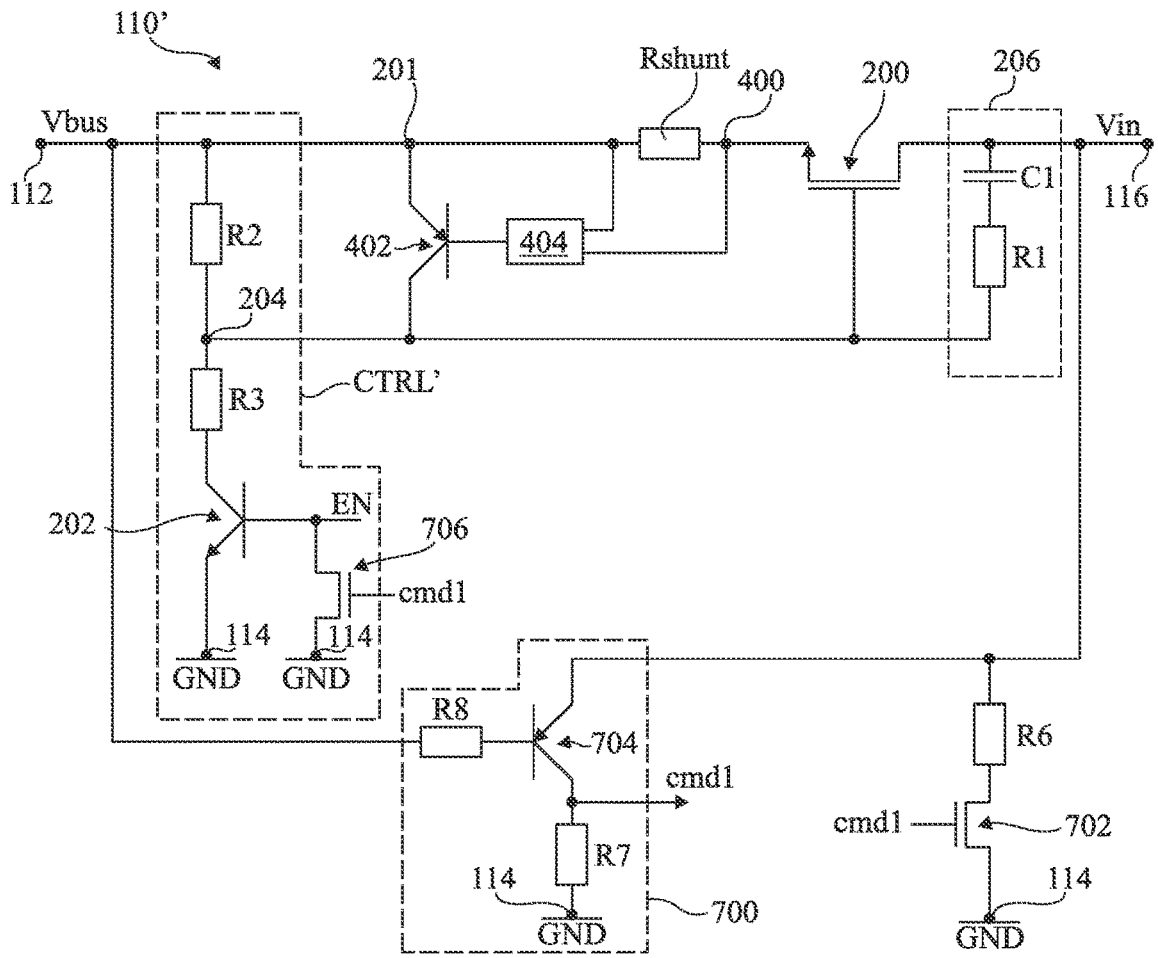
FIG. 7 schematically shows an alternative embodiment of the interface of FIG. 5.

FIG. 7 schematically shows an example of such an alternative embodiment of interface 110'. The interface 110' of FIG. 7 comprises many elements in common with that of FIG. 5 and only the differences between these interfaces are here highlighted. Further, to avoid overloading FIG. 7, circuit 404 is here shown in the form of a block.

As compared with the interface 110' of FIG. 5, the interface 110' of FIG. 7 further comprises a circuit 700 and a switch 702.

Circuit 702 is configured to deliver a binary signal cmd1 in a first binary state, for example corresponding to a high state of signal cmd1, when potential Vin is greater than potential Vbus increased by a margin. Circuit 702 is further configured to deliver signal cmd1 in a second binary state, for example corresponding to a low state of signal cmd1, when potential Vin is smaller than or equal to potential Vbus increased by a margin.

Switch 702 is configured to couple node 116 to node 114 when signal cmd1 is in its first state.

Thus, when potential Vin becomes greater than potential Vbus increased by the margin, that is, when potential Vin becomes greater than the sum of potential Vbus and of this margin, circuit 700 switches signal cmd1 to its first binary state, which causes the turning on of switch 702. As a result, node 116 is coupled to node 114 via switch 702 and capacitive element C (FIG. 1) connected between nodes 116 and 114 discharges to ground GND.

As soon as potential Vin becomes equal to or smaller than potential Vbus increased by the margin, circuit 700 switches signal cmd1 to its second binary state, which causes the turning off of switch 702. This results in the stopping of the discharge of capacitive element C and of the decrease of potential Vin.

Preferably, switch 702 is in series with a resistor R6 between nodes 116 and 114, the resistor preferably coupling node 116 to switch 702.

As an example, switch 702 is implemented by a MOS transistor, for example, an NMOS transistor. For example, the gate of transistor 702 receives signal cmd1, the source of transistor 702 is coupled, for example, connected, to node 114, and the drain of transistor 702 is coupled to node 116.

According to an embodiment illustrated in FIG. 7, circuit 700 comprises a PNP transistor 704. Transistor 704 has a base coupled to node 201, in this example by a resistor R8, a collector coupled to node 114 by a resistor R7, and an emitter coupled, for example, connected, to node 116. Signal cmd1 is available on the collector of transistor 704, or, in other words, signal cmd1 is delivered by the collector of transistor 704. As an example, the margin added to potential Vbus is at least partly determined by the turn-on threshold of the base-emitter diode of transistor 704. For example, the margin added to potential Vbus is at least determined by the turn-on threshold of the base-emitter diode of transistor 704 and, in this example, by the value of resistor R8.

According to an embodiment, interface 110' is further configured, during the discharge of capacitive element C (FIG. 1), that is, while switch 702 is on, to open the power path between nodes 112 and 116, to avoid for a positive current to flow from node 116 to node 112.

More particularly, in the embodiment illustrated in FIG. 7, this functionality is implemented by means of circuit CTRL' and of transistor 200. Circuit CTRL' is then configured to control the turning off of transistor 200 when signal cmd1 is in its first binary state. According to an embodiment, circuit CTRL' comprises a switch 706 coupling the base of transistor 202 to node 114, switch 706 being configured to be on when signal cmd1 is in its first binary state. As an example, switch 706 is implemented by a MOS transistor, for example, an NMOS transistor. NMOS transistor 706 has, for example, its gate configured to receive signal cmd1, its drain coupled, preferably connected, to the base of transistor 202, and its source coupled, preferably connected, to node 114. Thus, when signal cmd1 is in its first binary state, switch 706 pulls the base of transistor 202 to ground GND, whereby transistor 200 turns off.

In another embodiment, not illustrated, where transistor 300 (FIG. 3) is arranged between node 121 and node 112, the opening of the power path is implemented by turning off the two transistors 200 and 300. It will be within the abilities of those skilled in the art to adapt the control circuit of transistor 300 so that transistor 300 turns off when signal cmd1 is in its first binary state.

Although this is not the case in FIG. 7, the interface 110' preferably comprises the transistor 300 between the nodes 201 and 112. Thus, when the potential Vbus is lower than the potential Vin and the transistor 300 is blocked, the potential Vbus is not modified by the circuit 700. Indeed, in the absence of the transistor 300, when the potential Vbus is lower than the potential Vin and the transistor 200 is blocked, the potential Vbus may be changed due to a positive leakage current flowing from node 116 to node 201, via circuit 700.

Although in FIG. 7 circuit 404 and transistor 402 are implemented and connected in the way described in relation with FIG. 5, it will be within the abilities of those skilled in the art to adapt the description made in relation with FIG. 7 to the cases where the emitter of transistor 402 is connected to node 400 rather than to node 201, and/or the dividing bridge R4, R5 of circuit 404 is connected to node 201 rather than to node 400 or circuit 404 is implemented with an operational amplifier or circuit 404 corresponds to a direct connection of node 201 to the base of transistor 402, and/or the dividing bridge R2, R3 of the circuit CTRL' is connected to node 400 rather than to node 201.

Figure 8:
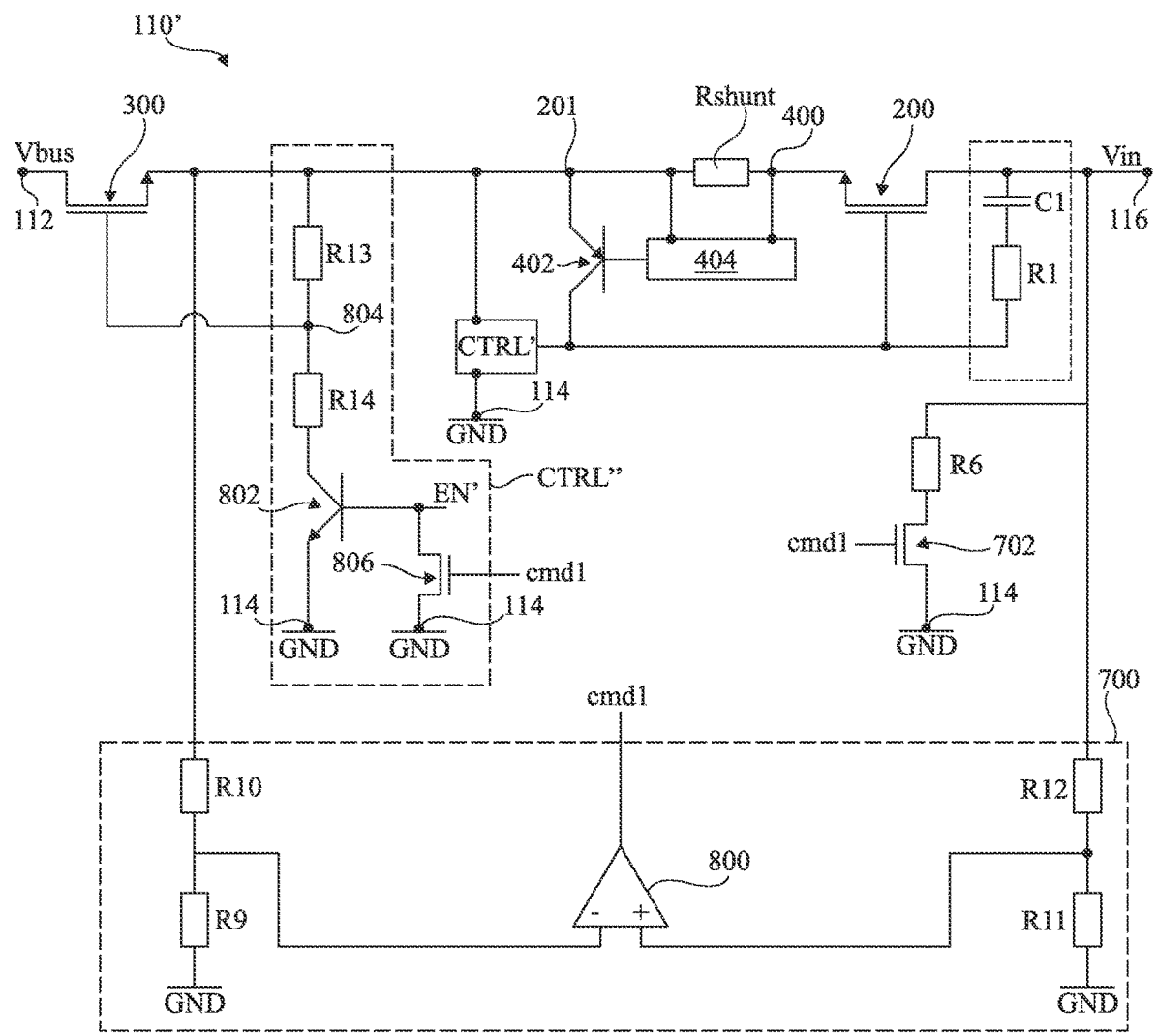
FIG. 8 schematically shows another alternative embodiment of the interface of FIG. 5.

FIG. 8 schematically shows another alternative embodiment of the interface 110' of FIG. 5. The interface 110' of FIG. 8 comprises many elements in common with that of FIG. 7, and only the differences between these two interfaces 110' are here highlighted. To avoid overloading FIG. 8, circuits 404 and CTRL' are shown in the form of blocks therein.

In the variant of FIG. 8, circuit 700 does not comprise transistor 704 and resistors R7 and R8. In this variant, circuit 700 comprises a comparator Boo implemented by an operational amplifier. Operational amplifier Boo comprises a first input, for example, inverting (−), coupled to node 201, a second input, for example, non-inverting (+), coupled to node 116, and an output delivering signal cmd1.

For example, as shown in FIG. 8, the first input of comparator Boo is coupled to node 112 by a voltage dividing bridge, and the second input of comparator Boo is coupled to node 116 by another voltage dividing bridge. Preferably, the first input is coupled, for example, connected, to an intermediate node of the dividing bridge coupling node 201 to node 114, the latter comprising, for example, two resistors R9 and R10 in series between nodes 201 and 114, the second input being coupled, for example connected, to an intermediate node of the dividing bridge coupling node 116 to node 114, the latter comprising, for example, two resistors Rn and R12 in series between nodes 116 and 114. In another example not shown, the first input of comparator 800 is connected to node 112 rather than to node 201, by a voltage divider bridge connected between nodes 112 and 114.

The margin added to potential Vbus during the comparison may be determined by means of the values of the resistors of the dividing bridges of circuit 700 and may be selected as being null, that is, omitted.

An advantage of the embodiment of the circuit 700 of FIG. 8 over that of FIG. 7 is that its response time is shorter, which results in a faster detection when potential Vin is greater than potential Vbus possibly increased by the margin.

According to an embodiment, as in FIG. 7, the interface 110' of FIG. 8 is further configured during the discharge of capacitive element C (FIG. 1), that is, while switch 702 is on, to open the power path between nodes 112 and 116, to avoid for a positive current to flow from node 116 to node 112.

More particularly, in the embodiment illustrated in FIG. 8, the interface comprises transistor 300 coupling node 201 to node 112, and this functionality is implemented by means of transistor 300 and of a circuit CTRL" for controlling transistor 300. Circuit CTRL" is then configured to control the turning off of transistor 300 when signal cmd1 is in its first binary state.

According to an embodiment illustrated in FIG. 8, circuit CTRL" is similar to the circuit CTRL' previously described in relation with FIG. 7 and comprises an NPN transistor 802 and a voltage dividing bridge series-connected between node 114 and node 201 or 400, in this example, node 201. The emitter of transistor 802 is coupled, for example, connected, to node 114, the collector of transistor 802 being coupled to node 201 (or 400 if desired) by the voltage dividing bridge. In this example, the voltage dividing bridge comprises two resistors R13 and R14, resistor R13 having a terminal connected to node 201 (or 400 if desired). An intermediate node of the dividing bridge, in this example a node 804 of connection of resistor R13 to resistor R14, is connected to the gate of transistor 300. The base of transistor 802 is configured to receive a binary signal EN'. Binary signal EN' is for example delivered by a portion, not shown, of circuit CTRL." When signal EN' is in a first binary state, for example corresponding to a high potential, transistor 300 is on. When signal EN" is in a second binary state, for example corresponding to a low potential, for example ground potential GND, transistor 300 is clamped. Like the circuit CTRL' of FIG. 7, to control the turning off of transistor 300 when signal cmd1 is in its first binary state, circuit CTRL" comprises a switch 806 coupling the base of transistor 802 to node 114. Switch 806 is configured to be on when signal cmd1 is in its first binary state. As an example, switch 806 is implemented by a MOS transistor, for example, an NMOS transistor. NMOS transistor 806 has, for example, its gate configured to receive signal cmd1, its drain coupled, preferably connected, to the base of transistor 802, and its source coupled, preferably connected, to node 114. Thus, when signal cmd1 is in its first binary state, switch 806 pulls the base of transistor 802 to ground GND, whereby transistor 300 turns off.

As compared with the case of FIG. 7 where the power path is opened by the turning off of transistor 200, the embodiment of FIG. 8 where the power path is opened by the turning off of transistor 300 has the advantage that the body diode of off transistor 300 opposes the flowing of a positive current from node 116 to node 112, which is not the case for the body diode of transistor 200.

Although this is not illustrated, in other variants, circuit 700 is implemented as described in relation with FIG. 7 and the power path is opened by means of transistor 300 and of circuit CTRL," or circuit 700 is implemented as described in relation with FIG. 8 and the power path is opened by means of transistor 200 and of control circuit CTRL'.

In the same way as for FIG. 7, it will be within the abilities of those skilled in the art to adapt the description made in relation with FIG. 8 to the cases where the emitter of transistor 402 is connected to node 400 rather than to node 201, and/or the dividing bridge R4, R5 of circuit 404 is connected to node 201 rather than to node 400 or circuit 404 is implemented with an operational amplifier or circuit 404 corresponds to a direct connection of node 201 to the base of transistor 402, and/or the dividing bridge R2, R3 of circuit CTRL' is connected to node 400 rather than to node 201.

In the interface 110' previously described in relation with FIG. 4, FIG. 5, FIG. 6, FIG. 7, or FIG. 8, when a renegotiation of the supply power received by interface 110' causes an increase of potential Vbus, it would be desirable, as for example required by the USB PD technology, for capacitive element C (FIG. 1), and more generally application 120, not to draw current during the increase of potential Vbus.

Thus, according to an embodiment, interface 110' comprises a device configured to turn off transistor 200 when potential Vbus increases from a first set point value to a second set point value greater than the first one, these set point values being for example determined by corresponding negotiated powers.

Figure 9:
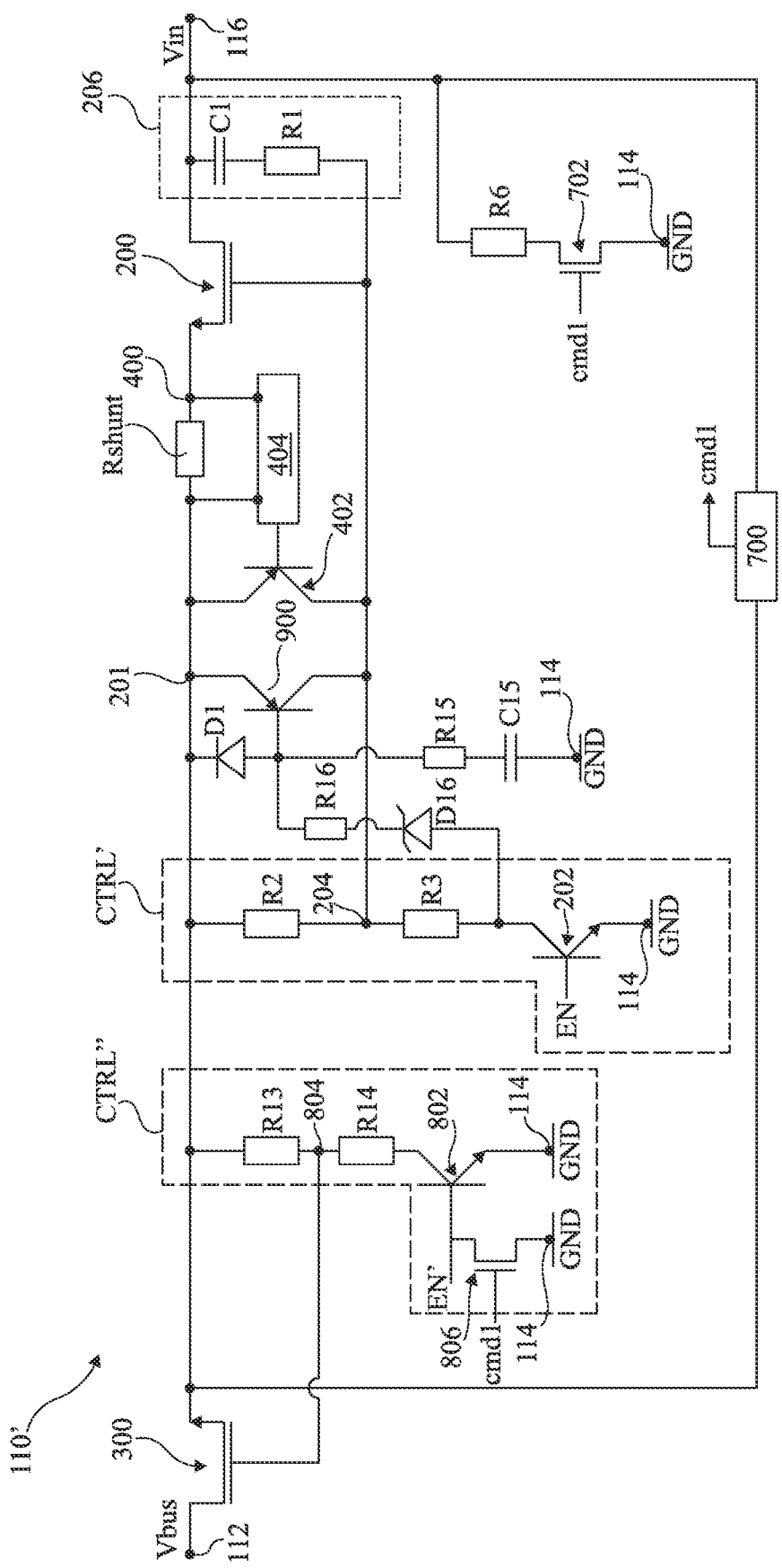
FIG. 9 schematically shows an alternative embodiment of the interface of FIG. 8.

FIG. 9 schematically shows an alternative embodiment of the interface 110' of FIG. 8, where interface 110' is configured to turn off switch 200 when potential Vbus increases due to a power supply renegotiation. To avoid overloading the drawing, circuits 404 and 700 have been shown in the form of blocks. Further, only the differences between the interface 110' of FIG. 9 and that of FIG. 8 are here highlighted.

As compared with the interface 110' of FIG. 8, the interface 110' of FIG. 9 further comprises an NPN transistor 900. Transistor 900 has an emitter coupled, for example, connected, to node 201 or 400, in this example to node 201. Transistor 900 has a collector connected to the gate of transistor 200. Interface no' further comprises a resistor R15 and a capacitive element C15 series-connected between a base of transistor 900 and node 114.

When potential Vbus is at a first set point value, capacitive element C15 is charged to a potential substantially equal to Vbus or, in other words, the potential of the electrode of capacitive element C15 which is opposite to the electrode of capacitor C15 connected to node 114 is substantially equal to Vbus. If potential Vbus increases to a second set point value greater than the first one, this results in an increase in the base-emitter voltage of transistor 900. As a result, this enables capacitive element C15 to charge, following the increase of potential Vbus, as long as transistor 900 remains on. Further, as long as transistor 900 remains on, the gate-source voltage of transistor 200 is such that transistor 200 is off and that no current is drawn to node 116.

When potential Vbus settles at its second set point value and capacitive element C15 has charged to a potential substantially equal to this second set point voltage, transistor 900 is clamped, and the gate-source voltage of transistor 200 is then determined by circuit CTRL' and sufficient to switch transistor 200 to the on state, while limiting the inrush current to charge capacitive element C (FIG. 1) by means of transistor 402 and of its control circuit 404.

According to an embodiment, interface 110' further comprises a device for discharging capacitive element C15 when potential Vbus becomes smaller than potential Vin, for example, when the set point value of potential Vbus is revised downwards, or when the device delivering the supply power to interface 110' is disconnected.

Such is for example the case in FIG. 9. In the example of FIG. 9, this discharge device is a simple diode D1 coupling the base of transistor 900 to the emitter of transistor 900, the anode of diode D1 being on the side of the base, for example, connected to the base of transistor 900.

In another example, not illustrated, the device of discharge of capacitive element C15 is implemented by means of a switch connected in parallel with capacitor C15. This switch is for example controlled from signal cmd1 or from a signal derived from signal cmd1, for example, to be turned off when transistor 202 is clamped. For example, this switch is implemented with an NMOS transistor having its gate coupled to the collector of transistor 202.

According to an embodiment where circuit CTRL' is implemented by transistor 202 and by a dividing bridge, for example, R2, R3, transistor 900 may also be used to turn off transistor 200 during an overvoltage on potential Vbus. Such is the case in FIG. 9 where interface 110' further comprises a Zener diode D16 and a resistor R16 in series between the base of transistor 900 and the collector of transistor 202, the anode of diode D16 being on the side of the collector of transistor 202, for example, connected to the collector of transistor 202.

Although FIG. 9 shows the case where, when potential Vin is greater than potential Vbus possibly increased by a margin, the power path is opened by the turning off of transistor 300, the description of FIG. 9 applies to the case where the opening of the power path is performed by turning off transistor 200, or even the two transistors 200 and 300.

Further, as for FIG. 7 and FIG. 8, it will be within the abilities of those skilled in the art to adapt the description made in relation with FIG. 9 in the cases where the emitter of transistor 402 is connected to node 400 rather than to node 201, and/or the dividing bridge R2, R3 of circuit CTRL' is connected to node 400 rather than to node 201, and/or the dividing bridge R13, R14 of circuit CTRL" is connected to node 400 rather than to node 201, and/or interface 110' does not comprise transistor 300 and its control circuit.

In the embodiments and variants described hereabove in relation with FIG. 4, FIG. 5, FIG. 6, FIG. 7, FIG. 8, and FIG. 9, signal EN and, possibly signal EN' are for example delivered by a processing unit for example comprising a microcontroller, a state machine, or a microprocessor. As a variant, signal EN is delivered by a dividing bridge coupling node 201 or node 400 to node 114, for example by an intermediate node of this voltage dividing bridge and, possibly, signal EN' is delivered by this same dividing bridge and for example corresponds to signal EN, or is delivered by another dividing bridge coupling node 201 or 400 to node 114, signal EN' being available on an intermediate node of this other voltage dividing bridge.

Further, although embodiments and variants where interface 110' is more particularly adapted to operating with a capacitive element C (FIG. 1) having a value greater, for example, at least ten times greater, than the maximum value of this capacitive element defined by the USB PD technology, have been described, an advantage of interface 110' is that it may also be used with a value of capacitive element C smaller than or equal to this maximum value. Interface 110' may thus be implemented whatever the value of capacitive element C, without for this value to be known.

Although the interface 110' has been described in the case where the latter is connected to a USB-C connector, this interface 110' can be used with other types of connectors.

Furthermore, although embodiments and variants have been described in which the transistor 202 is a bipolar transistor, in variant embodiments where the signal EN is supplied by a digital circuit, for example a microcontroller, the transistor 202 can be replaced by a MOS transistor, for example an NMOS transistor. Similarly, in embodiments and variations where the control signal EN' of transistor 802 is provided by a digital circuit, transistor 802 can be replaced by a MOS transistor, for example an NMOS transistor.

In the described embodiments and variants, the interface comprises circuit 206. However, this circuit 206 can be omitted, in particular when circuit 404 comprises a direct connection from the base of transistor 402 to node 400 like this has been described in relation with FIG. 4.

In addition, it will be noted that the embodiments and variants in which the interface 110' comprises the transistor 300 and where none of the circuits CTRL', CTRL" and 700 is connected to the node 112, have the advantage of avoiding leakage of positive current from node 116 to node 112, when the potential Vin is greater than the potential Vbus.

Various embodiments and variants have been described. Those skilled in the art will understand that certain features of these various embodiments and variants may be combined, and other variants will occur to those skilled in the art. In particular, those skilled in the art are able to adapt the above-described embodiments and variants to the case where the transistor 200 and, when it is present, the transistor 300, are implemented with NMOS transistors rather than PMOS, in particular by replacing the PNP transistors by NPN transistors, the NPN transistors by PNP transistors, and by adapting the nodes to which these transistors are connected. For example, when an NPN transistor having its emitter coupled or connected to node 114 at the potential GND is replaced by a PNP transistor, the emitter of the PNP transistor is coupled or connected to a node at a reference potential other than the potential GND, this new reference potential being greater than the Vbus potential.

Finally, the practical implementation of the described embodiments and variations is within the abilities of those skilled in the art based on the functional indications given hereabove. In particular, the implementation of circuits CTRL', CTRL", 404, and 700 is not limited to the above-described examples and it will be within the abilities of those skilled in the art to provide other implementations for these circuits.

What is claimed is:

1. A universal serial bus (USB) power delivery (PD)-type interface comprising:
 a first node configured to receive a first power supply potential, a second node configured to deliver a second power supply potential, and a third node configured to be at a reference potential;
 a first resistor coupled between a fourth node coupled to the first node, and a fifth node;
 a first metal-oxide-semiconductor (MOS) transistor coupled between the fifth node and the second node;
 a bipolar transistor having a collector coupled to a gate of the first MOS transistor and an emitter coupled to the fourth node or the fifth node; and
 a first circuit configured to deliver a control potential to a base of the bipolar transistor determined from a current in the first resistor, the first circuit comprising an operational amplifier having a first input coupled to the fourth node, a second input coupled to the fifth node, an output coupled to the base of the bipolar transistor, and a diode and a second resistor in series between the fourth node or the fifth node and the third node, a node of connection of the diode and of the second resistor being configured to deliver a floating ground to the operational amplifier, a gain of the operational amplifier being variable and determined by the first power supply potential.

2. The interface according to claim 1, wherein the first circuit is configured to determine the control potential to limit the current in the first resistor with respect to a current threshold.

3. The interface according to claim 2, wherein the first circuit is configured to increase a base-emitter voltage of the bipolar transistor when the current in the first resistor increases above the current threshold.

4. The interface according to claim 1, wherein the first MOS transistor is a P-channel MOS (PMOS) transistor, and the bipolar transistor is a PNP transistor.

5. The interface according to claim 4,
 wherein the emitter of the bipolar transistor is coupled to the fourth node and the first circuit comprises a direct connection between the base of the bipolar transistor and the fifth node; or
 wherein the first circuit comprises an NPN transistor having an emitter coupled to the third node and a collector coupled to the fourth node or to the fifth node by a voltage dividing bridge comprising an intermediate node configured to supply the control potential, and a circuit configured to supply a potential to the base of the NPN transistor determined from a voltage across the first resistor, a gain between the voltage across the first resistor and the control potential being variable and determined by the first power supply potential.

6. The interface according to claim 4, further comprising:
 a second circuit configured to deliver a binary signal in a first binary state when the second power supply potential is greater than the first power supply potential possibly increased by a margin; and
 a switch configured to couple the second node to the third node when the binary signal is in its first state.

7. The interface according to claim 6, wherein the second circuit comprises:
 a PNP transistor having a base coupled to the fourth node, a collector coupled to the third node by a resistor, and an emitter coupled to the second node, the binary signal being delivered by the collector of the PNP transistor; or
 a comparator comprising an operational amplifier having a first input coupled to the fourth node or to the first node, a second input coupled to the second node, and an output delivering the binary signal.

8. The interface according to claim 4, further comprising a circuit for controlling the first MOS transistor comprising a fifth transistor and a voltage dividing bridge having an intermediate node coupled to the gate of the first MOS transistor, the fifth transistor of the circuit for controlling the first MOS transistor having a conduction terminal coupled to the third node and another conduction terminal coupled to the fourth node or to the fifth node by the voltage dividing bridge, the fifth transistor of the circuit for controlling the first MOS transistor being an NPN transistor and the interface further comprising another voltage dividing bridge coupling the fourth node or the fifth node to the third node and having an intermediate node coupled to the base of the NPN transistor of the circuit for controlling the first MOS transistor.

9. The interface according to claim 8, further comprising:
 a second circuit configured to deliver a binary signal in a first binary state when the second power supply potential is greater than the first power supply potential possibly increased by a margin; and
 a switch configured to couple the second node to the third node when the binary signal is in the first binary state, and wherein the circuit for controlling the first MOS transistor further comprises a switch configured to couple a control terminal of the fifth transistor of the circuit for controlling the first MOS transistor to the third node when the binary signal is in the first binary state.

10. The interface according to claim 4, further comprising a second PMOS transistor coupling the fourth node to the first node.

11. The interface according to claim 10, further comprising a circuit for controlling the second PMOS transistor comprising a fifth transistor and a voltage dividing bridge having an intermediate node coupled to the gate of the second PMOS transistor, the fifth transistor of the circuit for controlling the second PMOS transistor having a conduction terminal coupled to the third node and another conduction terminal coupled to the fourth node or the fifth node by the voltage dividing bridge, the fifth transistor of the circuit for controlling the second PMOS transistor being an NPN transistor and the interface further comprising another voltage dividing bridge coupling the fourth node or the fifth node to the third node and having an intermediate node coupled to the base of the NPN transistor of the circuit for controlling the second PMOS transistor.

12. The interface according to claim 11, further comprising:
 a second circuit configured to deliver a binary signal in a first binary state when the second power supply potential is greater than the first power supply potential possibly increased by a margin; and a switch configured to couple the second node to the third node when the binary signal is in the first binary state, wherein the circuit for controlling the second PMOS transistor further comprises a switch configured to couple a control terminal of the fifth transistor of the circuit for controlling the second PMOS transistor to the third node when the binary signal is in the first binary state.

13. The interface according to claim 4, further comprising:
an NPN transistor having an emitter coupled to the fourth node or to the fifth node, and a collector coupled to a gate of the first MOS transistor;
a resistor; and
a capacitive element series-coupled with the resistor between a base of the NPN transistor and the third node.

14. The interface according to claim 13, further comprising a device for discharging the capacitive element configured to discharge the capacitive element when the second power supply potential is greater than the first power supply potential possibly increased by a margin.

15. The interface according to claim 14, wherein the device for discharging comprises:
a diode having its anode coupled to the base of the NPN transistor and having its cathode coupled to the emitter of the NPN transistor; or
a switch coupled in parallel with a capacitor.

16. The interface according to claim 13, further comprising:
a circuit for controlling the first MOS transistor comprising a fifth transistor and a voltage dividing bridge having an intermediate node coupled to the gate of the first MOS transistor, the fifth transistor of the circuit for controlling the first MOS transistor having a conduction terminal coupled to the third node and another conduction terminal coupled to the fourth node or to the fifth node by the voltage dividing bridge; and
a resistor and a Zener diode series-coupled between the base of the NPN transistor and the conduction terminal of the fifth transistor of the circuit for controlling the first MOS transistor.

17. A sink device comprising:
a universal serial bus (USB) connector;
a USB power delivery (PD)-type interface comprising:
a first node configured to receive a first power supply potential from the USB connector, a second node configured to deliver a second power supply potential, and a third node configured to receive a reference potential from the USB connector;
a first resistor coupled between a fourth node coupled to the first node, and a fifth node;
a first metal-oxide-semiconductor (MOS) transistor coupled between the fifth node and the second node;
a bipolar transistor having a collector coupled to a gate of the first MOS transistor and an emitter coupled to the fourth node or to the fifth node; and
a first circuit configured to deliver a control potential to a base of the bipolar transistor determined from a current in the first resistor;
a second circuit for controlling the first MOS transistor, the second circuit comprising a fifth transistor and a voltage dividing bridge having an intermediate node coupled to the gate of the first MOS transistor, the fifth transistor having a conduction terminal coupled to the third node and another conduction terminal coupled to the fourth node or the fifth node by the voltage dividing bridge, the fifth transistor being an NPN transistor and the interface further comprising another voltage dividing bridge coupling the fourth node or the fifth node to the third node and having an intermediate node coupled to the base of the NPN transistor of the circuit; and
a circuit or application coupled to and configured to be powered by the USB PD-type interface.

18. The sink device according to claim 17, wherein the first circuit is configured to determine the control potential to limit the current in the first resistor with respect to a current threshold.

19. The sink device according to claim 18, wherein the first circuit is configured to increase a base-emitter voltage of the bipolar transistor when the current in the first resistor increases above the current threshold.

20. The sink device according to claim 17, wherein the first MOS transistor is a P-channel MOS (PMOS) transistor, and the bipolar transistor is a PNP transistor.

21. A universal serial bus (USB) power delivery (PD)-type interface comprising:
a first node configured to receive a first power supply potential, a second node configured to deliver a second power supply potential, and a third node configured to be at a reference potential;
a first resistor coupled between a fourth node coupled to the first node, and a fifth node;
a first metal-oxide-semiconductor (MOS) transistor coupled between the fifth node and the second node;
a second PMOS transistor coupling the fourth node to the first node;
a bipolar transistor having a collector coupled to a gate of the first MOS transistor and an emitter coupled to the fourth node or the fifth node;
a first circuit configured to deliver a control potential to a base of the bipolar transistor determined from a current in the first resistor; and
a second circuit for controlling the second PMOS transistor, the second circuit comprising a fifth transistor and a voltage dividing bridge having an intermediate node coupled to the gate of the second PMOS transistor, the fifth transistor having a conduction terminal coupled to the third node and another conduction terminal coupled to the fourth node or the fifth node by the voltage dividing bridge, the fifth transistor being an NPN transistor and the interface further comprising another voltage dividing bridge coupling the fourth node or the fifth node to the third node and having an intermediate node coupled to the base of the fifth transistor.

* * * * *